(12) United States Patent
Nasrawi

(10) Patent No.: US 7,117,525 B1
(45) Date of Patent: Oct. 3, 2006

(54) INTEGRATED APPLICATION ENVIRONMENT

(75) Inventor: Dennis J Nasrawi, Pleasant Hill, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 889 days.

(21) Appl. No.: 09/836,758

(22) Filed: Apr. 16, 2001

(51) Int. Cl.
*G06F 15/16* (2006.01)

(52) U.S. Cl. .............................. 726/3; 709/236; 707/3

(58) Field of Classification Search .............. 713/201; 709/206, 236; 705/35, 71; 345/236; 726/3; 707/3
See application file for complete search history.

(56) References Cited

U.S. PATENT DOCUMENTS

| | | | | |
|---|---|---|---|---|
| 6,094,649 A | * | 7/2000 | Bowen et al. ................. 707/3 |
| 6,119,104 A | * | 9/2000 | Brumbelow et al. .......... 705/35 |
| 6,393,569 B1 | * | 5/2002 | Orenshteyn ................. 713/201 |
| 6,745,229 B1 | * | 6/2004 | Gobin et al. ................ 709/206 |

* cited by examiner

*Primary Examiner*—Hosuk Song
*Assistant Examiner*—T. B. Truong
(74) *Attorney, Agent, or Firm*—Fenwick & West LLP

(57) ABSTRACT

A computing environment includes client computers in communication with a mainframe computer. The mainframe computer stores customer data under keys. A client computer is adapted to execute one or more application programs and a desktop bus. Each application program has a bus interface component for enabling the application program to communicate with the bus. Upon execution, each application program preferably registers with the bus. When an application program learns a key from a source other than the bus, the application program sends a message to the bus including the key. The bus stores the key and, depending upon whether another application is designated as either "hot" or "cold," either sends the key to the application or notifies the application that the key has changed. In response to receiving the key, the application accesses the mainframe to retrieve the associated customer data.

24 Claims, 6 Drawing Sheets

INTEGRATED APPLICATION ENVIRONMENT

FIELD OF THE INVENTION

This invention pertains in general to a computing environment for supporting customer support services and in particular to a computer environment for sharing data among multiple computer programs.

BACKGROUND ART

Customer service representatives, such as representatives behind a customer service desk at a retail establishment or performing telephone-based customer support at a call center, require the ability to quickly access customer information. Customer information includes information such as account numbers, names and addresses, transactions performed by customers, and bills or other statements provided to the customers. Typically, this information is stored on a centralized mainframe computer system and accessed via a networked client computer system.

Representatives typically use a terminal emulator program to access programs and data stored at the mainframe via command line or menu-based programs. These programs are tightly integrated and allow representatives to access all of a customer's information nearly concurrently. For example, if a representative calls up the address of a customer, the representative, through a few commands, can easily call up transaction data for the same customer.

However, the functionality of such data access methods is inherently limited by the nature of terminal emulator programs. In general, the command line and/or menu-based programs lack the ease of use of more modern applications that execute on the client computer. Client-based programs can take advantage of graphical user interfaces (GUIs) and other functionality provided by modern operating systems. Therefore, there is a general desire to transition away from terminal emulator programs and toward programs that execute on the client computer, even though customer data are still held on the mainframe computer system.

In order to ease development, the customer service functionality is preferably provided by a suite of application programs. For example, one program allows a representative to update a customer's address, while another program allows the representative to perform transactions on behalf of the customer. Ideally, the programs work together, so that when a representative calls up a particular customer in one program, the representative can easily call up the same customer in the other programs.

In practice, however, such integration between the programs is difficult to achieve. One way to enable this integration is to provide each program with the ability to communicate and/or control the other programs. This solution works if there are only a few programs, but rapidly breaks down if there are multiple applications that must communicate with each other. Moreover, such direct communication creates a chain of dependencies throughout the programs. If one application program is changed, the change may affect all of the other programs that send messages to, or receive messages from, the changed program. As a result, client-based applications are frequently not integrated and therefore require the representative to re-enter the customer information into each program in order to separately call up information about the customer.

Therefore, there is a need in the art for a way to integrate multiple client-based application programs in a manner that is conducive to use by a customer service representative. The solution to this need should be relatively easy to implement, occupy a small footprint on the client computer, and be scalable in order to support many applications.

DISCLOSURE OF THE INVENTION

The above need is met by an integrated application environment in which applications communicate with a desktop bus storing a key indicating the current customer. An embodiment of the present invention may have hundreds or thousands of client computer systems. The clients are utilized by customer support representatives or other people (collectively referred to as "users") to enter, access, and/or modify information related to a customer.

The clients are coupled via a network to a mainframe computer system having a database. The database preferably holds information about customers. For example, the database holds data related to potential customer contacts, customer addresses, customer accounts, customer transactions, customer billings, etc.

A client preferably executes the desktop bus as a standalone application program. The bus is a centralized store of information. Preferably, the bus contains a logical table having three entries, although the table can have any practical number of entries. Each entry can hold data corresponding to a different session, where each session corresponds to a different customer. In a preferred embodiment, each table entry can hold an extensible markup language (XML) string containing values for one or more keys. Customer information is indexed on the mainframe such that customer information can be retrieved using any one of the keys.

The client is also adapted to run other application programs for creating, viewing, modifying, and/or searching customer information stored at the mainframe. Preferably, each application has a bus interface component (BIC) for enabling the application to interact with the bus. The BIC is a language-specific proxy and preferably supplies an API through which the application can communicate with the BIC and the bus. Different implementations of the BIC support applications developed using different languages, thereby allowing the present invention to simultaneously support applications develop in different languages.

The client is also preferably adapted to execute a control bar application. This application displays a control bar on the display of the client. In general, the control bar allows the user to control the information displayed by the other applications. In a preferred embodiment of the present invention, the control bar has several on-screen "buttons" that a user can select. One set of buttons selects the active session. In a preferred embodiment of the present invention, there are three session selection buttons corresponding to three possible sessions. Preferably, the session selection buttons are color-coded so that each session has a unique and visually distinctive color.

According to a preferred embodiment of the present invention, the windows of certain applications executed by the client display color bars. In one embodiment, an application's BIC draws the color bar and varies the color of the bar in response to messages from the application and/or bus indicating whether the customer information displayed in the window is current. For example, if the bar is a color associated with the current session, then the window is displaying current information. If, in contrast, the bar has a neutral color, then the window is displaying stale information.

Preferably, applications can be designated as either "cold" or "hot." Hot applications that are in the background (i.e., do not have the focus) update automatically whenever a user changes the customer data in a foreground application (i.e., an application having the focus). The color bar of a hot application is always the color associated with the session, since a hot application always contains current data. Cold applications are not updated until the individual applications are brought to the foreground (i.e., given the focus). Therefore, regardless of whether an application is hot or cold, the application preferably always displays information about the current customer when brought to the foreground.

In an exemplary transaction flow according to an embodiment of the present invention, hot and cold applications initially register with the bus and obtain any keys previously stored in the bus. Then, the applications retrieve the customer information associated with the keys from the mainframe computer. Assume that the user uses the hot application to identify and select a particular customer. The hot application posts the key data associated with the selected customer to the bus. In response, the bus informs the cold application that it is no longer synchronized with the key data in the bus. If necessary, the cold application changes its color bar to a color signifying that it is not synchronized.

Assume next that that the user gives the cold application the focus by, for example, selecting the button corresponding to the application on the control bar. In response, the bus preferably sends the application a "take focus" message. Upon receiving this message or otherwise gaining the focus, the cold application preferably sends an "activate" message to the bus, thereby telling the bus that the application is ready to receive the key data. In response, the bus preferably sends a "take data" message containing the key data to the application. The cold application loads the data indicated by the key from the mainframe and sets its color bar to the color associated with the session. Similarly, the bus preferably supplies the new key to hot applications when the session changes, and informs cold application of the new session key when the cold applications are given the focus.

In sum, the present invention enables a set of separate applications to work together in an integrated manner. When a user looks up a customer or account in one application, the other applications automatically update to display information for that customer. In addition, the applications automatically update when the user switches among different sessions. Therefore, the burden on the user is significantly lessened.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
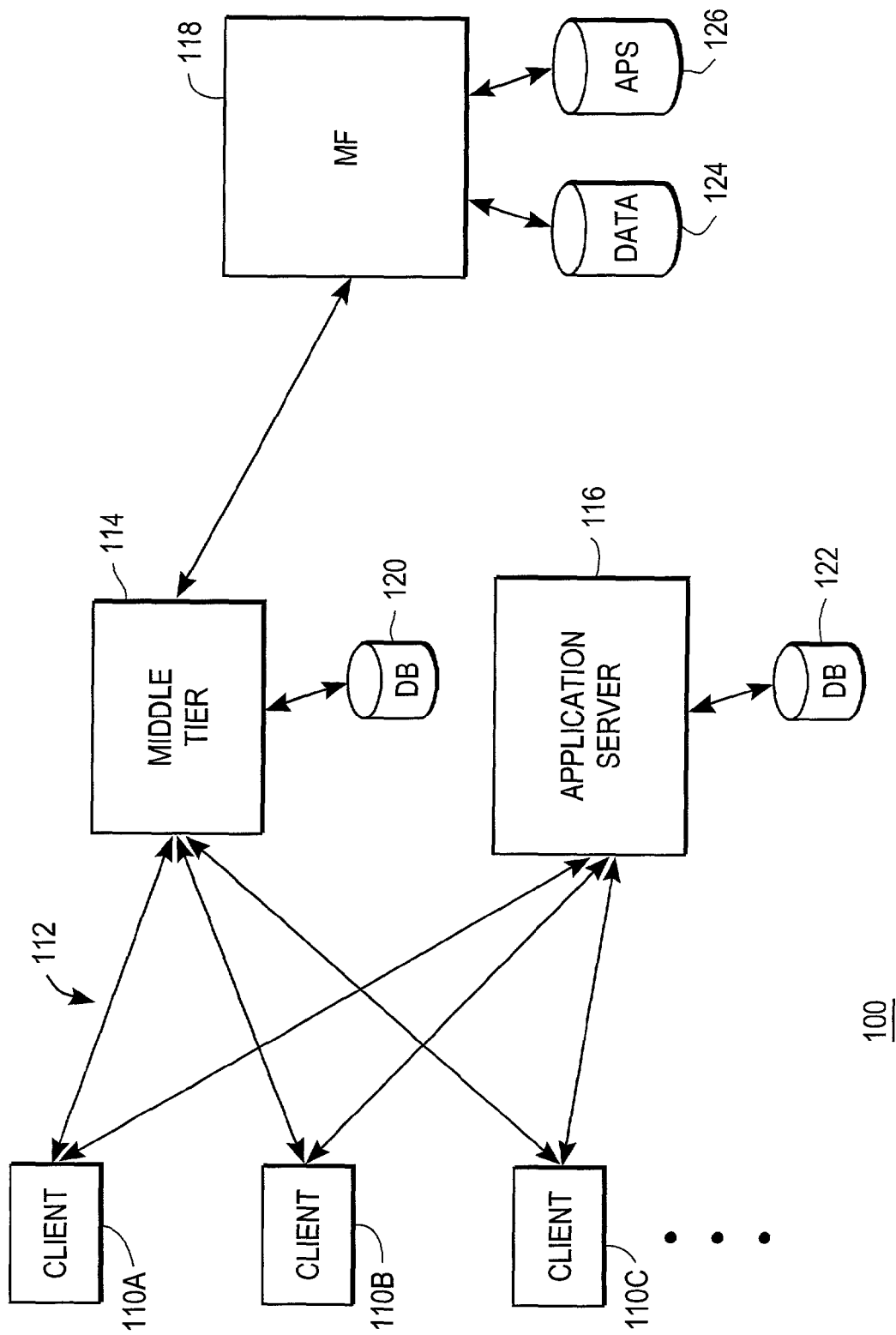
FIG. 1 is a high-level block diagram illustrating a computing environment according to one embodiment of the present invention.

FIG. 1 is a high-level block diagram illustrating a computing environment 100 according to one embodiment of the present invention. Illustrated are three client computers 110A, 110B, 110C (referred to herein as simply "clients"), which are representative of the hundreds or even thousands of client computers that may exist in the computing environment 100. Preferably, the clients 110 are standard personal computers, such as IBM PC- or Apple Macintosh-compatible computers. As is known in the art, the clients 110 execute operating systems which, in turn, control the execution of one or more application programs. In one embodiment of the present invention, the clients 110 are IBM PC-compatible computers executing the Microsoft NT 4.0 operating system.

In a preferred embodiment of the present invention, the clients 110 are utilized by customer support representatives or other people (collectively referred to as "users") to enter, access, and/or modify information related to a customer. One of skill in the art will recognize that the present invention is not limited to the customer service environment. Accordingly, the term "user" is intended to refer to any person or device that is interfacing with a client 110 and the term "customer" is intended to refer to any entity for which information can be accessed via the client, including, for example, individuals, households, and corporations or other groups of entities. In one embodiment, the user and customer are the same.

In general, one or more clients 110 are remote from the other clients. In one embodiment, several clients 110 are in each of hundreds of retail locations located throughout the country or world. In another embodiment, hundreds of clients 110 are located in a call center where users perform customer service functions on behalf of calling customers. In a preferred embodiment of the present invention, the clients 110 are in restricted access locations, such as behind counters, at retail locations and accessible by only specially-trained users.

In one embodiment, the clients 110 are coupled via a network 112 to a middle tier server 114 (referred to herein as a "middle tier") and an application server 116. As is known in the art, the network 112 communicates data between the clients 110 and the servers 114, 116. The network 112 may use any known networking technology and may utilize dedicated private links or pass through public communications links, such as the Internet.

The middle tier 114 is a computer system that acts as a conduit or gateway between the clients 110 and a mainframe computer system (the "mainframe") 118. In general, the middle tier 114 accesses the mainframe 118 in response to requests received from the clients 110 and exchanges information between the mainframes and clients. In one embodiment, the middle tier 114 accesses a database 120 holding software programs for implementing protocols for interacting with the clients 110 and/or mainframe 118 and for formatting the data exchanged between the computers.

Alternative embodiments of the computing environment may lack a middle tier 114. In such an embodiment, the clients 110 preferably communicate directly with the mainframe 118.

The application server 116 has a database 122 for storing applications for use by the clients 110. When a user launches an application at the client 110, the client communicates with the application server 116 via the network 112 and retrieves the application from the database 122. An advantage of using the application server 116 is that an application can be added or updated on all of the clients by merely placing or updating the application in the application server database 122. Alternative embodiments of the computing environment 100 store all or some of the applications locally at the clients 110 and, therefore, may not have an application server 116.

The mainframe 118 is preferably a computer having a large amount of processing power and storage capabilities. Exemplary mainframes 118 include the Z900 computer from IBM Corp. and the SKYLINE TRINIUM computer from Hitachi, Ltd. In alternative embodiments of the present invention, the functionality of the mainframe 118 is provided by one or more other types of computer systems, such as a cluster of less powerful server computers. Accordingly, the term "mainframe" is intended to include any computer system for performing the functionality attributed to the mainframe 118.

In one embodiment, the mainframe 118 has a data database 124 and an application database 126. The data database 124 preferably holds customer information that can be created, accessed, and/or modified by users of the clients 110. For example, the database 124 holds data related to potential customer contacts, customer addresses, customer accounts, customer transactions, customer billings, etc. In other words, the database 124 holds any information that an entity may need to store in order to maintain relationships with customers. The application database 126 preferably holds applications that are executed by the mainframe 118 and/or clients 110 in the same manner as the applications stored by the application server 116.

Figure 2:
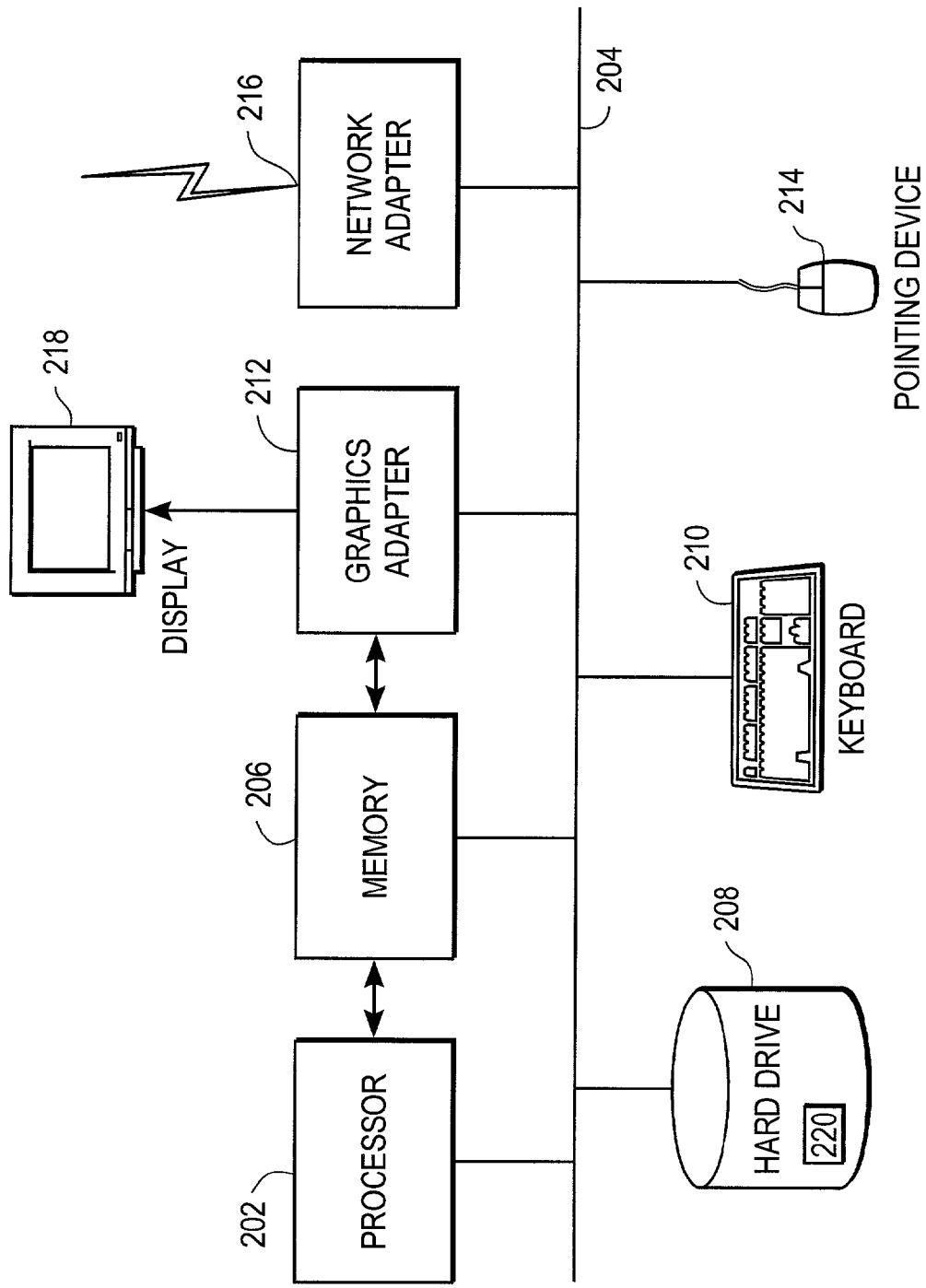
FIG. 2 is a high-level block diagram of a computer system for use as a client, middle tier, and/or application server according to one embodiment of the present invention.

FIG. 2 is a high-level block diagram of a computer system for use as a client 110, middle tier 114, and/or application server 116 according to one embodiment of the present invention. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The at least one processor 202 may be any specific or general-purpose processor such as an INTEL x86 or POWERPC-compatible central processing unit (CPU). The storage device 208 may be any device capable of holding large amounts of data, like a hard drive, compact disk read-only memory (CD-ROM), DVD, or some other form of fixed or removable storage device. The memory 206 holds instructions and data used by the processor 202. The pointing device 214 may be a mouse, track ball, light pen, touch-sensitive display, or other type of pointing device and is used in combination with the keyboard 210 to input data into the computer system 200. The network adapter 216 couples the computer system 200 to the network 112.

Program modules 220 for providing the functionality attributed to the clients 110, middle tier 114, and/or application server 116 herein are preferably stored on the storage device 208, loaded into the memory 206, and executed by the processor 202. Alternatively, hardware or software modules may be stored elsewhere within the computer system 200. As used herein, the term "module" refers to computer program logic and/or any hardware or circuitry utilized to provide the functionality attributed to the modules. For example, the customer service application programs executed on the client 110 are program modules 220. The types of hardware and software within the computer system 200 may vary depending upon how the computer system is utilized. For example, a computer system used as the middle tier 114 is likely to have greater processing power and storage capacity than a computer system used as a client 110.

Figure 3:
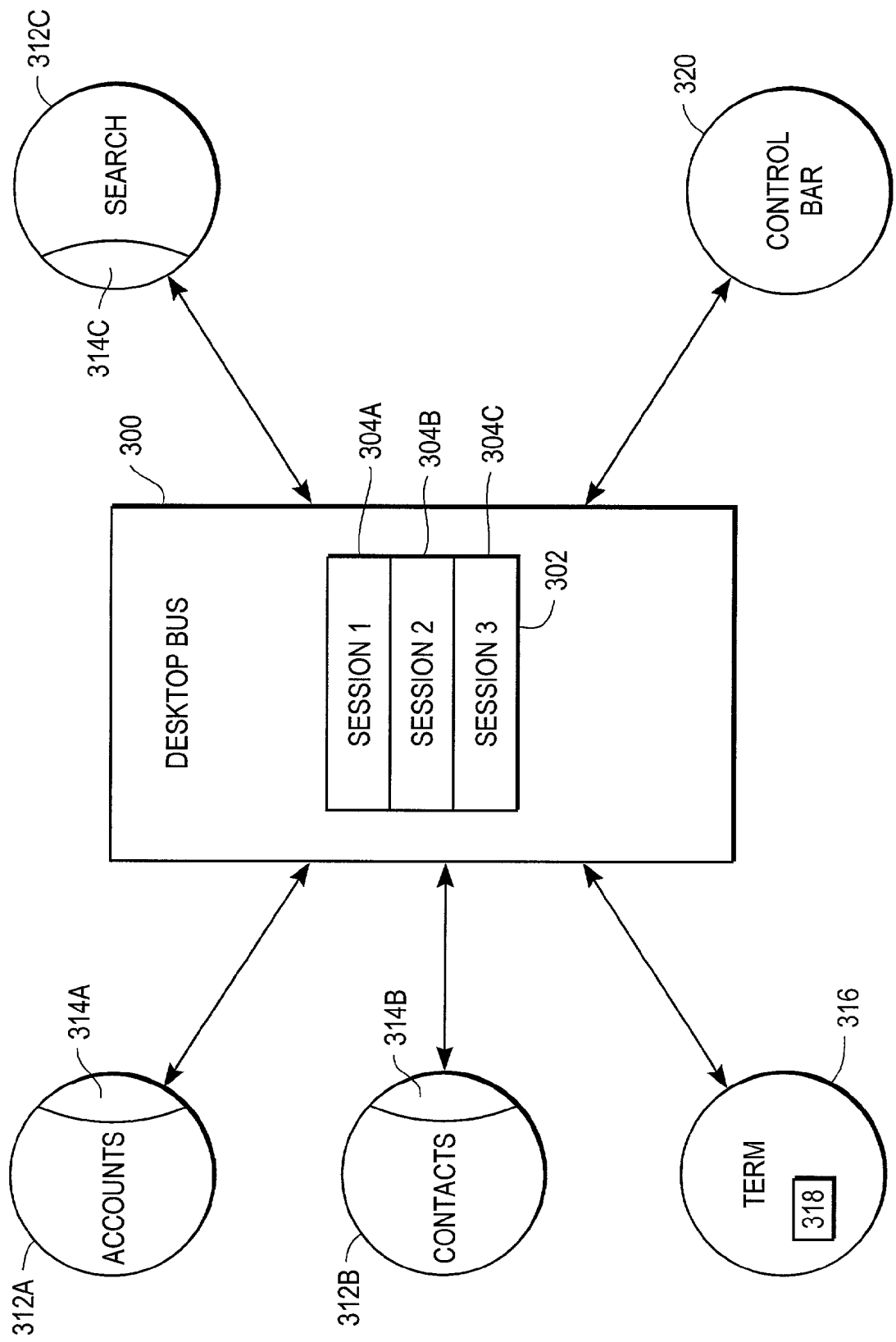
FIG. 3 is a high-level block diagram illustrating applications adapted for execution on a client according to an embodiment of the present invention.

FIG. 3 is a high-level block diagram illustrating applications adapted for execution on a client 110 according to an embodiment of the present invention. FIG. 3 illustrates a desktop bus 300 (referred to herein as the "bus") in communication with several different application programs 312. The bus 300 is a centralized store of information and is preferably implemented as a standalone application program executing on the client 110 and occupying relatively little memory. Preferably, the client 110 is configured to automatically load and execute the bus 300 every time the client is started.

In a preferred embodiment of the present invention, the bus 300 contains a logical table 302 having three entries 304A, 304B, 304C. Alternative embodiments of the present invention have more, or fewer, entries. Each entry 304 can hold data corresponding to a different session, where each session typically corresponds to a different customer. In a preferred embodiment, each table entry 304 can hold an extensible markup language (XML) string containing values for one or more keys that identify a customer. In one embodiment, the keys are: KEY_ACCOUNT, KEY_CUSTOMER, and KEY_HOUSEHOLD. KEY_ACCOUNT preferably identifies the account number of the customer, KEY_CUSTOMER preferably identifies the individual customer using the account, and KEY_HOUSEHOLD preferably identifies the household associated with the customer and account. Customer information is preferably indexed on the mainframe 118 such that customer information can be retrieved using any one of the keys.

FIG. 3 also illustrates multiple applications 312A–C executing on the client 110. The illustrated applications 312 represent examples of applications that can be executed on the client 110. As such, one should understand that fewer or more applications may be executing on the client at any given time. Likewise, the functions performed by the applications can vary depending upon the specific embodiment.

In the example of FIG. 3, application 312A is called "Accounts" and allows a user to retrieve from the mainframe 118, view, and modify information about a customer identified by a particular key. For example, Accounts 312A allows a user to change the mailing address of a customer. In one embodiment of the present invention, Accounts 312A is developed using the Microsoft Visual Basic programming language. In another embodiment, Accounts 312A is developed using a variant of the C++ programming language or any other language that produces a Win32 application programming interface (API)-compatible executable program.

Application 312B is called "Contacts" and allows a user to manage contacts with customers and prospective customers. Preferably, Contacts 312B also allows a user to retrieve from the mainframe 118, view, and modify information about a customer identified by a particular key. In one embodiment, Contacts 312B is developed using tools available from Siebel Systems, Inc. Alternatively, Contacts 312B is developed using any other development environment that supports the Component Object Model (COM). COM is a well-known technology for allowing applications to communicate.

Application 312C is called "Search" and allows a user to search the information stored at the mainframe 118 for keys or other information associated with particular customers. For example, a user can input a customer's name into Search 312C and retrieve the account keys of all customers having the same name. Thus, a user can use Search 312 to determine a customer's KEY_ACCOUNT, KEY_CUSTOMER, and/or KEY_HOUSEHOLD. In one embodiment, Search 312C is developed using the JAVA language available from Sun Microsystems, Inc. Thus, in one embodiment each of the three applications 312 described above is developed using a different language and/or development environment.

Preferably, each application 312 has a bus interface component (BIC) 314 for enabling the application to interact with the bus 300. The BIC 314 preferably supplies an API through which the application 312 can communicate with the BIC and the bus 300. In addition, the BIC 314 preferably provides other functionality, such as controlling the color bar 418 described with respect to FIG. 4.

In one embodiment of the present invention, there are multiple versions of the BIC 314 and the developer selects the version that matches the application development environment. The BIC 314 functions as a language-specific proxy between the application and the bus 300. One version of the BIC 314 is an ActiveX control that facilitates two-way communications between applications developed using Visual Basic and the bus 300. A second version of the BIC 314 is implemented as a library for inclusion in applications developed using C or C++. Another version of the BIC 314 is a JAVA class and interface for use with JAVA applications. Yet another version is a custom dynamic link library (DLL) that serves as an object linking and embedding (OLE) automation server for third-party applications such as Siebel-based applications. Other versions of the BIC 314 are within the scope of the present invention.

In one embodiment, the BIC 314 supports the following functions, which can be called by the associated application 312:

activate—notifies the bus 300 that the application 312 is in focus and ready to receive data;
getValue—parses data in an XML string;
in Sync—notifies the bus 300 that the application has refreshed its display and is synchronized with the bus; and
post—updates the key data stored in the bus 300.

In addition, the BIC supports the following events, which can be triggered by the bus 300:

ActivateApp—notifies the application 312 that it has been given focus by the user;
ColorChange—notifies the application that the session color has changed;
takeData—sends updated bus key data to the application 312; and
takeFocus—tells the application 312 to bring itself into focus.

These functions and events are described in more detail below.

FIG. 3 also illustrates a terminal emulator application 316 called "Term." As is known in the art, Term 316 preferably emulates a dedicated terminal for accessing the mainframe 118. Rather than a BIC, a preferred embodiment of Term 316 has a key capture module 318 for selectively capturing keystrokes input to the application and sending the keystrokes to the bus 300. In one embodiment, the key capture is enabled/disabled by toggling a seldom used key, such as the "pause" key found on most IBM PC-compatible computer keyboards. The bus 300 preferably saves data sent to it from Term 316 as a key.

In addition, FIG. 3 illustrates a control bar application 320. This application 320 preferably displays a control bar 420 on the display of the client 110 with which a user can control the operation of the client, bus 300, and applications 312 executing on the client. In one embodiment, the functionality of the control bar application 320 is included in the bus 300 instead of in a standalone application.

Figure 4:
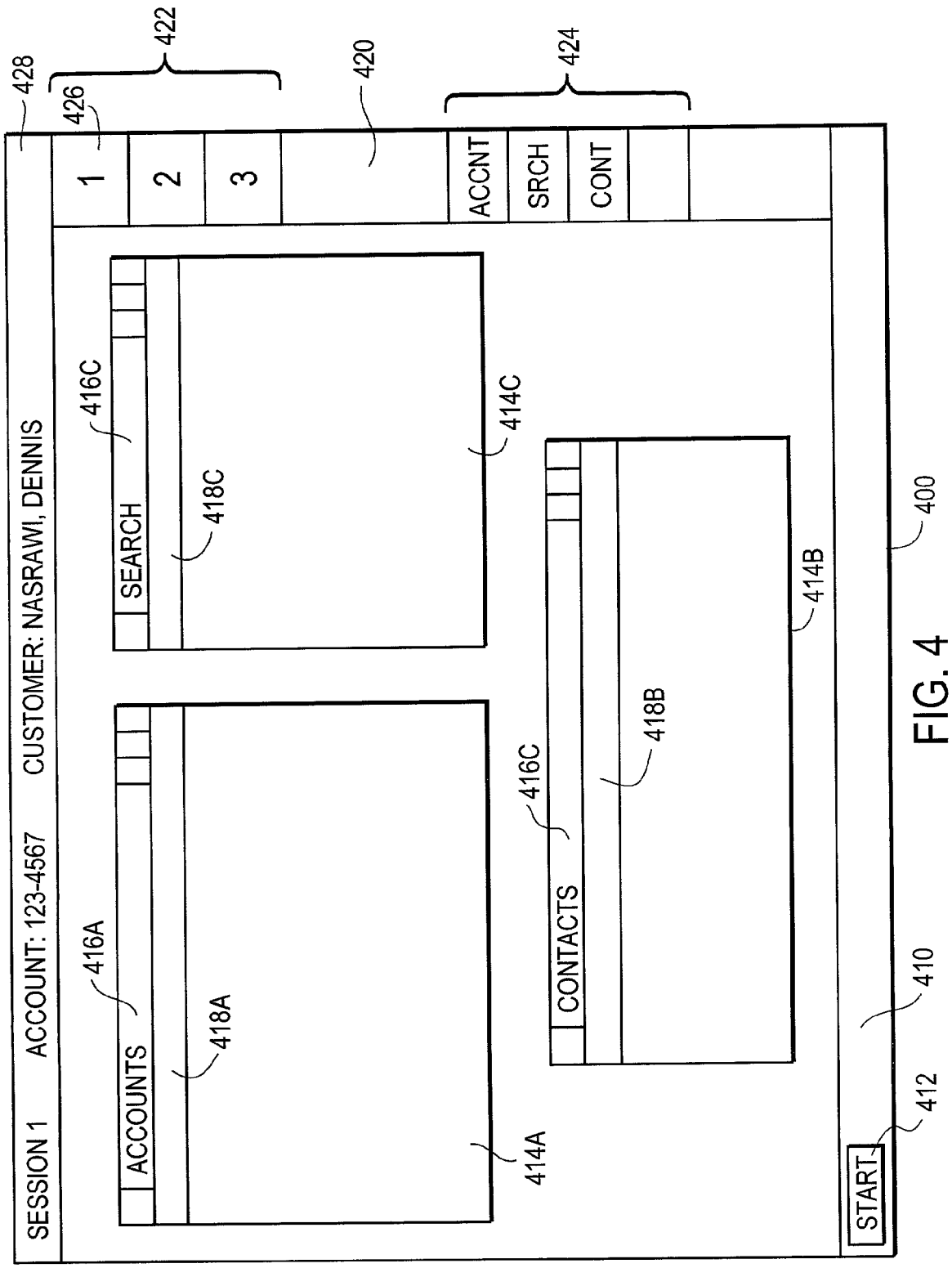
FIG. 4 illustrates an exemplary screen display on a client according to an embodiment of the present invention.

FIG. 4 illustrates an exemplary screen display 400 on a client 110 according to an embodiment of the present invention. The screen display 400 is a typical representation of a windowed environment produced by a GUI-based operating system, such as Microsoft Windows NT 4.0, and the modifications produced by a preferred embodiment of the present invention. As such, the screen display 400 shows a taskbar 410 having a start button 412 as is commonly found in Microsoft operating systems.

The screen display 400 also illustrates three application windows 414A–C. In the example of FIG. 4, window 414A is the Accounts application 314A, window 414B is the Contacts application 314B, and window 414C is the Search application 414C. As is known in the art, each window typically has a title bar 416 displaying the name of the application. In addition, each window 414 can display certain information about a customer. For example, the Accounts window 414A preferably displays information about a customer's account, such the account number (or another key), account type, account holders, etc. The Contacts window 414B preferably displays information about contacts made with the customer, such as whether the customer requested information about a certain product, requested an account balance, placed an order, etc. Similarly, the Search window 414C displays a tool that allows a user to search for customers by, for example, name, key, Tax ID number, etc. and displays search results.

According to a preferred embodiment of the present invention, each window 414 also displays a color bar 418 along the top of the window, just below the title bar 416. In one embodiment, the BIC 314 draws the color bar as a 10-pixel thick line. The BIC 314 preferably varies the color of the bar 418 in response to messages from the application 312 and the bus 300 indicating whether information displayed in the associated window 414 is current or stale. If the color of the bar 418 is the color associated with a session, then the associated window 414 is displaying current information. If, in contrast, the bar 418 has a neutral color, such as gray, or a color associated with a session other than the active session, then the associated window 414 is displaying stale information.

An advantage of the color bar 418 is that a user can tell from a single glance whether to rely upon the information in the window 414. However, those of ordinary skill in the art will recognize that other mechanisms can be used to convey this information, such as changing the color of text within the windows 414, pictographically differentiating between the sessions or stale and current data, and/or minimizing windows containing stale information. In addition, those of ordinary skill in the art will recognize that the color bar 418 can be located in another portion of the window 414 or incorporated into the title bar 416.

The screen display 400 also illustrates the control bar 420 along the right side of the display. The control bar 420 is preferably produced by the control bar application 320. As with the taskbar 410, the control bar 420 is preferably always on top of the other applications and can be moved to different sides of the display. In addition, alternative embodiments of the present invention represent the control bar 420 in a different manner. For example, in one embodiment the control bar 420 is displayed within a dedicated window on the display. In another embodiment, the functionality of the control bar is incorporated directly into the application windows 414.

In a preferred embodiment of the present invention, the control bar 420 has several on-screen "buttons" that a user can select. One set of buttons 422 selects the active session. In a preferred embodiment of the present invention, there are three session selection buttons 422 corresponding to three possible sessions. However, one of ordinary skill in the art will recognize that any practical number of sessions is possible.

Preferably, the session selection buttons 422 are color-coded so that each session has a unique and visually distinctive color. In one embodiment, for example, session one is blue, session two is yellow, and session three is green. Preferably, the BIC 314 matches an application's color bar 418 to the corresponding session selection button when the application displays current data for that session. For example, if the Contacts window 414B has current information for session two, the associated color bar 418B is yellow.

The session selection buttons 422 allow a user to easily switch the applications 414 among data associated with different customers. In a customer service environment, it is occasionally desirable or necessary to interact with several customers simultaneously. The active session selection buttons 422 allow the user to switch all of the application windows 414 to display information about a specific customer. For example, assume the user selects session "1" and looks up account and contact information for a first customer. If the user needs to look up information about a second customer, the user can select a different session and use the same applications to look up and view account and contact information for the second customer. The present invention preserves the state of each session, so that the user does not need to re-retrieve customer information upon switching back to a previously-utilized session. When desired, the user can use the session selection buttons 422 to return to the first session, thereby causing the applications to again display information about the first customer.

In one embodiment of the present invention, the control bar 420 also has multiple other buttons 424 that control the applications and client 110 in various ways. In one embodiment, these other buttons 424 perform tasks such as launching applications and bringing applications to the foreground. The buttons 424 also preferably allow a user to review a list of favorite customers, review a list of customers that have been looked up at the client 110 within a specified time period, and perform other functions that are necessary or desired. In a preferred embodiment, the control bar 420 is customizable by the user. For example, the user can move and rearrange the displayed buttons and add or remove particular buttons.

In a preferred embodiment of the present invention, the bus 300 causes an information bar 428 to be displayed along a side of the display 400. In a preferred embodiment, the information bar 428 is dockable to the upper or lower side of the display 400 and is always visible. Preferably, the information bar 428 displays customer data, such as the account and/or customer name, stored in the bus 300 for the current session. The information bar 428 also preferably changes color or otherwise alters its display to indicate the current session. Thus, the information bar 428 provides an easy way for the user to identify the customer/account associated with the current session. In alternative embodiments of the present invention, the information bar 428 can be docked to the left or right side of the display 400 and/or displayed as a window on the display.

In a preferred embodiment of the present invention, applications within a given session are automatically updated so that looking up a customer in one application causes data for that customer to be displayed in the other applications. For example, if a user uses the Search application 414C to identify and select a certain customer, the present invention automatically updates the Accounts application 414A to show account information for that customer and the Contacts application 414B to show contact information for that customer. Likewise, if the user uses the Contacts application 414B to look up contact information for a new customer, the present invention preferably automatically updates the Accounts application 414A to show the data for the new customer. As a result, a user does not need to look up the customer in each application.

Preferably, applications 414 can be designated as either "cold" or "hot." Hot applications that are in the background (i.e., do not have the focus) update automatically whenever a user changes customer information in a foreground application (i.e., an application having the focus). The color bar 418 of a hot application will always be the color associated with the session, since a hot application always contains current data. In one embodiment of the present invention, the information bar 428 is implemented as a standalone hot application.

The present invention preferably does not update cold applications until the individual applications are brought to the foreground (i.e., given the focus). Therefore, regardless of whether an application 414 is hot or cold, the application preferably always displays current information when brought to the foreground.

In one embodiment, the user uses buttons 424 on the control bar 420 or another interface to designate an application 414 as hot or cold. In an alternative embodiment, each application 414 has a facility for designating the application as either hot or cold. Preferably, the hot/cold designations are saved in a profile accessible by the bus 300.

Figure 5:
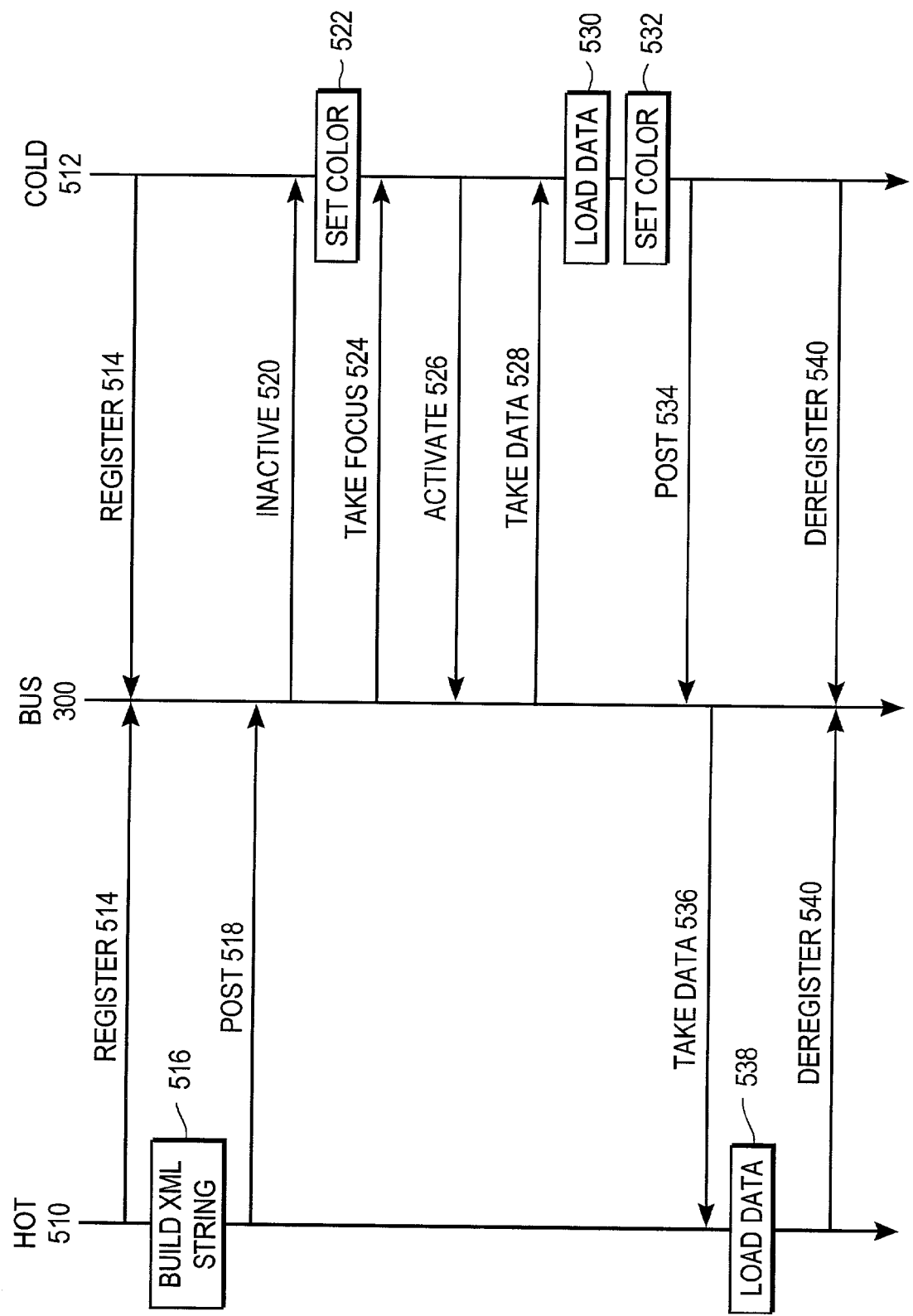
FIG. 5 is a ladder diagram illustrating an exemplary set of transactions among a hot application, a cold application, and the bus according to an embodiment of the present invention.

FIG. 5 is a ladder diagram illustrating an exemplary set of transactions among a hot application 510, a cold application 512, and the bus 300 according to an embodiment of the present invention. The hot 510 and cold 512 applications represent typical applications having the BIC 316 for controlling interactions with the bus 300 as described above. It should be understood that the transactions illustrated in FIG. 5 represent only one possible set of transactions and implementations of the present invention may use variations or combinations of the illustrated transactions and may use more or fewer transactions than shown. It should also be understood that the functionality attributed to the applications 510, 512 may actually be performed by the BIC 316.

Turning to FIG. 5, initially, the hot 510 and cold 512 applications register 514 with the bus 300. Preferably, an application registers with the bus when the application is started. In one embodiment of the present invention, the application registers 514 by using Internet Protocol (IP) sockets to make a call to a dedicated port on the bus 300. The call preferably includes the application name and version and a private port for the application 510, 512. The bus 300 then establishes a connection with the application 510, 512 via the private port. However, alternative embodiments of the present invention can use alternative interprocess communications technologies such as COM, the Internet Inter-ORB Protocol (IIOP), dynamic data exchange, file mapping, pipes, remote procedure calls, or the WM_COPYDATA API. All of these techniques are available in the Win32 API.

In a preferred embodiment of the present inventions, the applications 510, 512 query the bus 300 for a current session key, if any, during registration. If a current session key is already established, then the bus 300 provides the keys to the applications 510, 512. The applications 510, 512, in turn, load the customer information associated with the key from the mainframe. In this manner, the applications show current customer information immediately upon startup.

After the applications 510, 512 are registered 514 with the bus 300, assume that the user uses the hot application 510 to identify and select a particular customer, account, etc. In response to this selection, the hot application 510 preferably builds 516 an XML string containing one or more bus directives, keys identifying the customer or the customer's account, and/or any additional application data and posts 518 this string to the bus. The XML string is preferably formatted as <tag_name>value</tag_name>, where the "<tag_name>" and "</tag_name>" tags delineate and specify the data held in "value." The present invention preferably uses an XML string because it provides a convenient and standard way to encode data. However, alternative embodiments can use alternative means for representing the data.

In one embodiment, the hot application 510 uses a Post subroutine to clear prior bus data and pass the new data to the bus. In this embodiment, an XML string that clears prior bus data for the current session and sets the current account key to 12345678 is:

"<BUS_CLEAR></BUS_CLEAR><KEY_ACCOUNT>12345678</KEY_ACCOUNT>"

where BUS_CLEAR is a tag telling the bus 300 to clear the customer information for the current session and KEY_ACCOUNT is the name of the tag identifying the new account key. The hot 510 (and cold 512) application preferably ensures that KEY_ACCOUNT, KEY_CUSTOMER, and KEY_HOUSEHOLD values supplied to the bus 300 are related, i.e., all point to the same account/customer/household.

In response, the bus 300 informs the cold application 512 that it is no longer synchronized with the key data in the bus. In one embodiment, the bus 300 performs this step by sending 520 an "inactive" message to the cold application 512. If necessary, the cold application 512 then changes 522 its color bar 418 to the color signifying that it is not synchronized. Although not shown in FIG. 5, the bus 300 can also send an "active" message to the cold application 512 indicating that the application is once again synchronized with the bus. The "active" message is useful when the bus data changes away from the cold application 512, but then is changed back.

Assume next that the user gives the cold application 512 the focus by selecting the button corresponding to the application on the control bar 420. In response, the bus 300 preferably sends 524 the application 512 a "take focus" message. Alternatively, assume that the user gives the cold application 512 the focus by using a technique that does not involve the bus 300, such as by selecting the application 512 using the Windows ALT+Tab command or clicking on the application with the pointing device 214.

Upon receiving the "take focus" message or otherwise gaining the focus, the cold application 512 preferably sends an "activate" message 526 to the bus 300, thereby telling the bus that the application is ready to receive the key data. In response, the bus 300 preferably sends 528 a "take data" message to the application 512. The "take data" message preferably contains an XML string formatted as described above with respect to the "post" command. If the key data in the XML string is different than the key data currently held by the cold application 512 (as it should be), the application preferably loads 530 the data indicated by the key from the mainframe 118. The cold application 512 also preferably sets 532 the color bar 418 to the color associated with the session and updates its display to show the data retrieved from the mainframe 118.

Now assume that the user uses the cold application 512 to load information from the mainframe 118 related to a different customer. Since this process changes the current key, the application 512 preferably sends 534 a "post" message to the bus 300 containing an XML string with the new key data. In response, the bus 300 sends 536 a "take data" message to the hot application 510. If necessary, the hot application loads the data 538 from the mainframe 118 and displays the data indicated by the key.

In a preferred embodiment of the present invention, the hot 510 and cold 512 applications preferably deregister 540 from the bus 300 when the applications are terminated. The deregistration closes the communications ports that were established to exchange messages.

Figure 6:
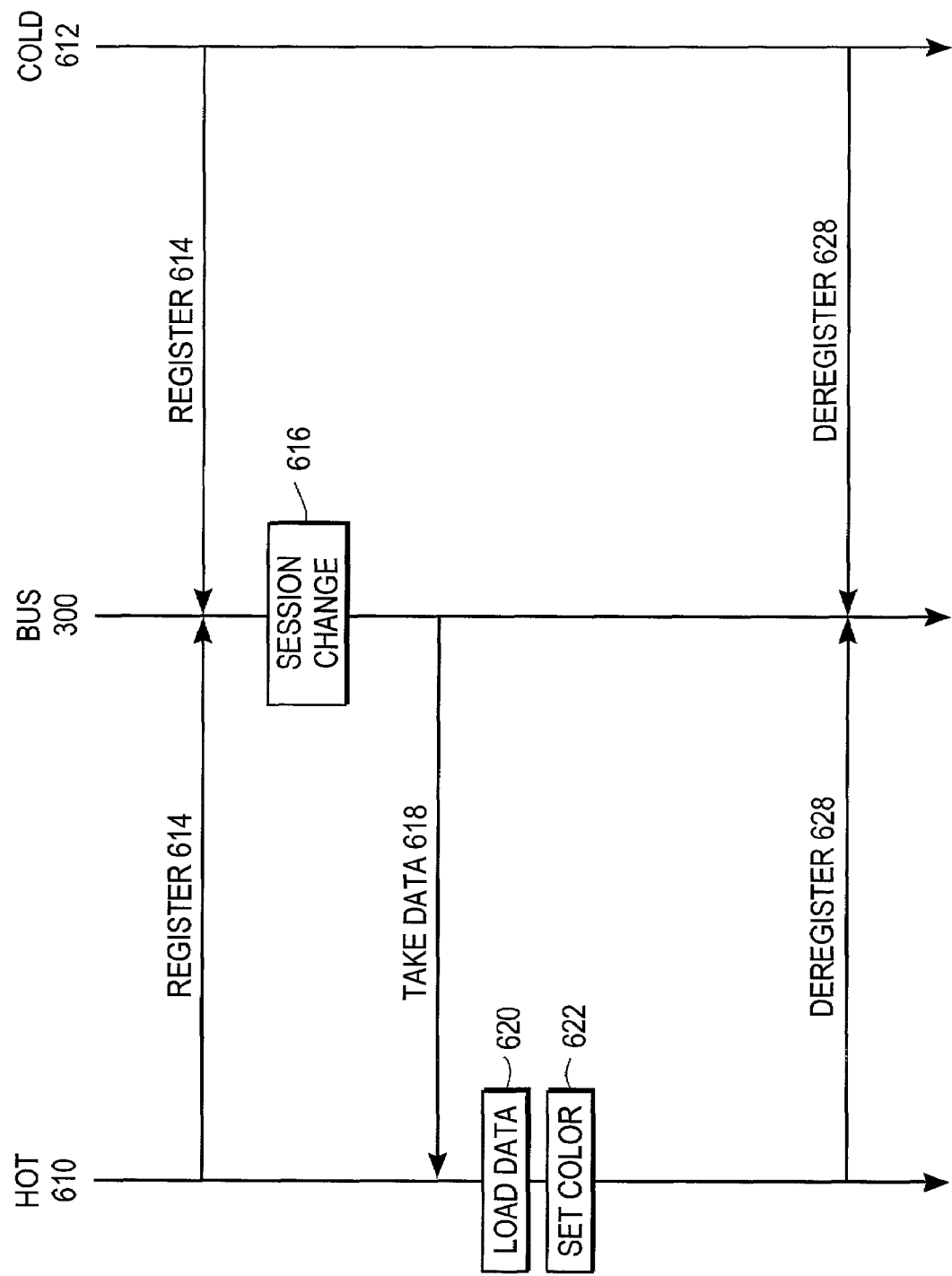
FIG. 6 is a ladder diagram illustrating an exemplary set of transactions among a hot application, a cold application, and the bus when performing a session change according to an embodiment of the present invention.

FIG. 6 is a ladder diagram illustrating an exemplary set of transactions among a hot application 610, a cold application 612, and the bus 300 during a session change according to an embodiment of the present invention. As with FIG. 5, the hot 610 and cold 612 applications represent typical applications having the BIC 316 for controlling interactions with the bus 300 and implementations of the present invention may use variations or combinations of the illustrated transactions and may use more or fewer transactions than shown.

Initially, the hot 610 and cold 612 applications register 614 with the bus 300. Then, at some point, the user changes 616 the active session by, for example, selecting one of the session selection buttons 422 on the control bar 420. Assume for purposes of this example that the bus 300 has previously stored key data for the new active session. The bus preferably sends 618 a "take data" message to the hot application 610 containing the key data for the active session. In response, the hot application 610 loads 538 from the mainframe 118 and displays the data identified by the key. In addition, the hot application 610 sets 622 the color bar 418 to the color associated with the new session.

The cold application 612 preferably does not change the color bar 418 at this stage because its initial color already indicates that the application is not synchronized with the newly active session but instead is synchronized with the initial session. The color bar 418 and contents displayed by the cold application 612 preferably remain unchanged until the application is either brought into focus or the user returns to the initial session and changes the keys on the bus 300 (at which point the cold application's color bar would change to indicate that the application contains stale data). Eventually, the hot 610 and cold 612 applications preferably deregister 628 from the bus 300 when the applications are terminated.

In sum, the present invention enables a set of separate applications to work together in an integrated manner. When a user looks up a customer in one application, the other applications automatically update to display information for that customer. In addition, the applications automatically update when the user switches among different sessions. Therefore, the burden on the user is significantly lessened.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. An integrated application environment, comprising:
   a client computer system adapted to communicate with a mainframe computer system, the mainframe computer system in communication with a database holding data about a plurality of customers, the data indexed by keys, the client computer system comprising:
      a desktop bus adapted to receive keys associated with a plurality of sessions and indexing data about customers stored in the database, store the received keys, and provide the stored keys to applications responsive to occurrences of pre-specified events;
      a first application in communication with the desktop bus for receiving as user input data representative of a key associated with a session and indexing data about a customer in the database, and for providing the key to the desktop bus; and
      a second application in communication with the desktop bus for receiving the key associated with the session from the desktop bus responsive to an occurrence of a pre-specified event, and for accessing the data about the customer in the database and indexed by the key;
   wherein the pre-specified event is at least one of:
      receipt of the key associated with the session from the first application; and
      the second application gaining focus.

2. The integrated application environment of claim 1, wherein the client computer system is coupled to a display for displaying graphical information, the client computer system further comprising:
   a control bar application adapted to graphically indicate on the display which of the plurality of sessions is active and adapted to enable selection of one of the plurality of sessions.

3. The integrated application environment of claim 1, wherein the client computer system is coupled to a display for displaying graphical information, the client computer system further comprising:
   an information bar displayed on the display, the information bar graphically indicating which of the plurality of sessions is active and adapted to display customer data associated with a key for the active session.

4. The integrated application environment of claim 1, wherein the second application is designated as "hot."

5. The integrated application environment of claim 1, wherein the second application is designated as "cold."

6. The integrated application environment of claim 1, further comprising:
   a bus interface component associated with the first application for enabling communications between the first application and the desktop bus.

7. The integrated application environment of claim 6, wherein the bus interface component is a language-specific proxy between the first application and the desktop bus.

8. The integrated application environment of claim 7, wherein there are a plurality of bus interface components for enabling a plurality of applications developed with a plurality of different development languages to communicate with the desktop bus.

9. The integrated application environment of claim 6, wherein the bus interface component comprises:
   a color bar module for graphically indicating whether the first application is displaying customer data associated with the key stored by the desktop bus.

10. The integrated application environment of claim 1, wherein the first and second applications are retrieved from an application server in communication with the client computer system.

11. A computer program product comprising a computer-usable medium having computer-readable code embodied therein for providing an integrated application environment, the computer-readable code comprising:
    a desktop bus module for receiving keys indexing data about customers and associated with a plurality of sessions, the data accessible from a remote computer system, storing the keys, and providing the keys to an application program responsive to occurrences of pre-specified events; and
    a bus interface module for enabling communications between the application program and the desktop bus module, the bus interface module adapted to provide a key to the desktop bus module and receive a key from the desktop bus module, wherein the key provided by the bus interface module to the desktop bus module is associated with a particular one of the plurality of sessions;
    wherein the pre-specified events are at least one of:
    receipt of the key associated with the session from the first application; and
    the second application gaining focus.

12. The computer program product of claim 11, further comprising:
    a control bar module adapted to graphically indicate which of the plurality of sessions is active and adapted to enable selection of one of the plurality of sessions.

13. The computer program product of claim 11, further comprising:
    an information bar module adapted to graphically indicate which of the plurality of sessions is active and display customer data associated with a key for the active session.

14. The computer program product of claim 12, wherein, responsive to a selection of one of the plurality of sessions, the desktop bus module is adapted to provide the key associated with the selected session to the bus interface module.

15. The computer program product of claim 11, wherein the desktop bus module and bus interface module exchange the key as an extensible markup language (XML) string.

16. The computer program product of claim 11, wherein the bus interface module comprises:
    a color bar module for graphically indicating whether the application program is displaying customer data associated with the key stored by the desktop bus module.

17. The computer program product of claim 11, wherein the bus interface module is a language-specific proxy between the application program and the desktop bus module.

18. The computer program product of claim 17, wherein there are a plurality of bus interface modules for enabling a plurality of application programs developed with a plurality of different development languages to communicate with the desktop bus module.

19. A method of providing an integrated application environment on a computer system, the method comprising the steps of:

receiving, by a first application, a key indexing data within a database;

providing the key from the first application to a centralized store of information holding a plurality of keys associated with a plurality of sessions, the key provided from the first application to the centralized store of information being associated with a particular one of the plurality of sessions;

providing the key from the centralized store of information to a second application responsive to an occurrence of a pre-specified event; and retrieving, by the second application, the data indexed by the key;

wherein the pre-specified event is at least one of:

receipt of the key associated with the session from the first application; and the second application gaining focus.

20. The method of claim 19, wherein the step of providing the key from the first application to the centralized store of information comprises the step of:

providing an extensible markup language (XML) string containing the key from the first application to the centralized store of information.

21. The method of claim 19, further comprising the steps of:

notifying the second application that data held by the second application is not current; and responsive to the notification, graphically indicating on a display associated with the computer system that the data held by the second application is not current.

22. The method of claim 21, further comprising the steps of:

notifying the second application to take focus; and responsive to receiving the notification to take focus, graphically indicating on the display that the data held by the second application is current;

wherein the pre-specified event is the notification to take focus.

23. The method of claim 19, further comprising the steps of:

receiving, by the centralized store of information, data representative of a change from a first session of the plurality of sessions to a second session of the plurality of sessions;

providing, from the centralized store of information to the first application responsive to receipt of the session change, a second key associated with the second session;

providing, from the centralized store of information to the second application responsive to receipt of the session change, a notification that data held by the second application is not current.

24. The method of claim 23, further comprising the steps of:

retrieving, by the first application, data indexed by the second key; and graphically indicating on a display associated with the client computer system that the data held by the first application is associated with the second session.

* * * * *